US010147338B2

(12) United States Patent
Trumbull et al.

(10) Patent No.: US 10,147,338 B2
(45) Date of Patent: Dec. 4, 2018

(54) HAZARDOUS GAS MONITORING TRAINING SYSTEM AND METHOD

(71) Applicant: Pacific Gas and Electric Company, San Francisco, CA (US)

(72) Inventors: Brian Trumbull, San Ramon, CA (US); Linda Floyd, San Ramon, CA (US); Chris Pickett, San Ramon, CA (US)

(73) Assignee: PACIFIC GAS AND ELECTRIC COMPANY, San Francisco, CA (US)

( * ) Notice: Subject to any disclaimer, the term of this patent is extended or adjusted under 35 U.S.C. 154(b) by 137 days.

(21) Appl. No.: 15/132,088

(22) Filed: Apr. 18, 2016

(65) Prior Publication Data

US 2016/0307468 A1    Oct. 20, 2016

Related U.S. Application Data

(60) Provisional application No. 62/148,609, filed on Apr. 16, 2015.

(51) Int. Cl.

| | |
|---|---|
| *A63F 9/24* | (2006.01) |
| *G09B 19/24* | (2006.01) |
| *G09B 5/02* | (2006.01) |
| *G06F 3/0484* | (2013.01) |
| *G09B 29/10* | (2006.01) |

(52) U.S. Cl.
CPC ......... *G09B 19/24* (2013.01); *G06F 3/04842* (2013.01); *G09B 5/02* (2013.01); *G06F 2203/04806* (2013.01); *G09B 29/106* (2013.01)

(58) Field of Classification Search
CPC .......... G01M 3/04; G09B 19/24; G09B 29/10
See application file for complete search history.

(56) References Cited

U.S. PATENT DOCUMENTS

| | | | | |
|---|---|---|---|---|
| 5,679,003 A | * | 10/1997 | Schwechel | G09B 9/00 434/219 |
| 6,599,127 B1 | * | 7/2003 | Hopmeier | F41A 33/00 434/16 |
| 7,705,988 B2 | * | 4/2010 | Richman | G01J 3/4338 356/432 |
| 2014/0028459 A1 | * | 1/2014 | Solomon | G01M 3/243 340/605 |
| 2014/0061962 A1 | * | 3/2014 | Lane | B29C 70/44 264/40.3 |

(Continued)

*Primary Examiner* — Steve Rowland
(74) *Attorney, Agent, or Firm* — Greenberg Traurig, LLP

(57) ABSTRACT

Embodiments of the invention include a gas training system with a computing device or server coupled to a mapping component and a virtual leak detector. The virtual leak detector is configured to communicate at least one location or GPS position data. A trainee device or good is coupled with the virtual leak detector discoverable by the computing device or server. A coupled non-transitory computer readable medium can cause the computing device or server to retrieve a map and/or image from the mapping component representing an actual training area or location. Further, based at least in part on the location or GPS position data received from the virtual leak detector, the map or map image is displayed with a representation of the trainee device or good positioned based at least in part on the actual physical location of the at least one trainee device or good.

20 Claims, 12 Drawing Sheets

(56) References Cited

U.S. PATENT DOCUMENTS

| | | | | |
|---|---|---|---|---|
| 2014/0323157 A1* | 10/2014 | Drukier | ............... | H04W 4/021 |
| | | | | 455/456.3 |
| 2014/0349707 A1* | 11/2014 | Bang | ..................... | H04Q 9/00 |
| | | | | 455/556.1 |
| 2016/0351040 A1* | 12/2016 | Zokaei | .................. | G08B 21/20 |

\* cited by examiner

HAZARDOUS GAS MONITORING TRAINING SYSTEM AND METHOD

RELATED APPLICATIONS

This application is claims priority from Provisional Application No. 62/148,609, filed on Apr. 16, 2015, the entire contents of which are incorporated herein by reference.

BACKGROUND

Live training for gas and gas pipelines can be expensive, create greenhouse gases, and can increase unnecessary risks to trainees, trainers, and members of the public. Some gas pipeline companies have built expensive training facilities with underground pipelines to simulate real world gas leaks. If environmental protection agencies or governments discourage or legislate against live gas training and testing, training facilities may not be able to continue to provide the same method or quality of training. To prepare for this eventuality, there is a need for an alternative to live gas training systems that take advantage of and effectively combine virtual training tools, real-world experience, and mobile communications systems.

SUMMARY

Some embodiments include a gas training system comprising at least one computing device or server coupled to a mapping component, and at least one virtual leak detector coupled to the at least one computing device or server, where the at least one virtual leak detector is configured to communicate at least one location or GPS position data. The gas training system comprises at least one trainee device or good coupled with the at least one virtual leak detector, and that is discoverable by the at least one computing device or server. Further, the gas training system comprises a non-transitory computer readable medium coupled to the at least one computing device or server, having stored thereon, instructions that when executed by the at least one computing device or server, cause the at least one computing device or server to perform operations. The operations include retrieving at least one map and/or image from the mapping component representing at least one actual training area or location. Further, based at least in part on the at least one location or GPS position data received from the at least one virtual leak detector, displaying at least one map or map image including a representation of the at least one trainee device or good in a position on the at least one map or map image based at least in part on the actual physical location of the at least one trainee device or good.

In some embodiments of the invention, the at least one trainee device or good comprises an actual or mock gas detector. In other embodiments, the at least one virtual leak detector comprises the at least one trainee device or good. In some embodiments, the at least one virtual leak detector is integrated or coupled with the at least one trainee device or good. In some further embodiments, the GPS position data comprises data or signals from a GPS unit coupled to or integrated with the at least one trainee device or good.

In some embodiments of the invention, the at least one computing device or server performing operations comprising displaying at least one map or map image in a GUI based at least in part on data or information from the mapping component. Some embodiments further comprise displaying a user selectable or adjustable menu, field, and/or toggle. In some embodiments, the map or map image includes a display of at least one virtual gas detector.

In some embodiments, the displayed position of the at least one virtual gas detector represents a physical location in the at least one actual training area or location. In some further embodiments, the at least one virtual gas detector is positioned, re-positioned or moved based at least in part on the GPS position data.

Some embodiments further comprise displaying at least one representation of a gas leak, hazard, or gas infrastructure. In some embodiments, the location of the at least one representation of a gas leak, hazard, or gas infrastructure is user-selectable.

Some embodiments further comprise displaying a representation of an emergency vehicle and/or a command trailer. Some further embodiments comprise displaying at least one image of a trainee carrying the at least one trainee device or good.

In some embodiments, the user selectable menu, field, and toggle includes layers, scenarios, and/or a device option. In some embodiments, the scenarios option is configured enable a user to define a training scenario, where the training scenario includes an option to define the number a specific number of gas leaks, the position of the gas leaks, the position of at least one emergency vehicle, and/or the position of at least one command trailer.

Some embodiments include a gas training server system comprising a computing device comprising at least one processor, and a non-transitory computer readable medium, having stored thereon, instructions that when executed by the at least one processor, cause the computing device to perform operations. The operations include retrieving location or GPS position data from at least one virtual leak detector coupled or integrated with at least one actual or mock gas detector, and retrieving at least one map and/or image from a mapping component representing at least one actual training area or location. Further, based at least in part on the at least one location or GPS position data received from the at least one virtual leak detector, displaying at least one map or map image including a representation of the at least one actual or mock gas detector in a position on the at least one map or map image based at least in part on the actual physical location of the at least one actual or mock gas detector.

In some embodiments, the at least one virtual gas detector is positioned, re-positioned or moved based at least in part on the GPS position data transmitted from the at least one actual training area or location. Some further embodiments comprise displaying at least one representation of a gas leak, hazard, or gas infrastructure. Other embodiments further comprise displaying a user selectable menu, field, and toggle including layers, scenarios, and/or a device option, where the menu, field or toggle is configured enable a user to define a training scenario. Further, the training scenario includes at least one of an option to define the number a specific number of gas leaks, the position of the gas leaks, the position of at least one emergency vehicle, and the position of at least one command trailer.

DETAILED DESCRIPTION

Figure 1:
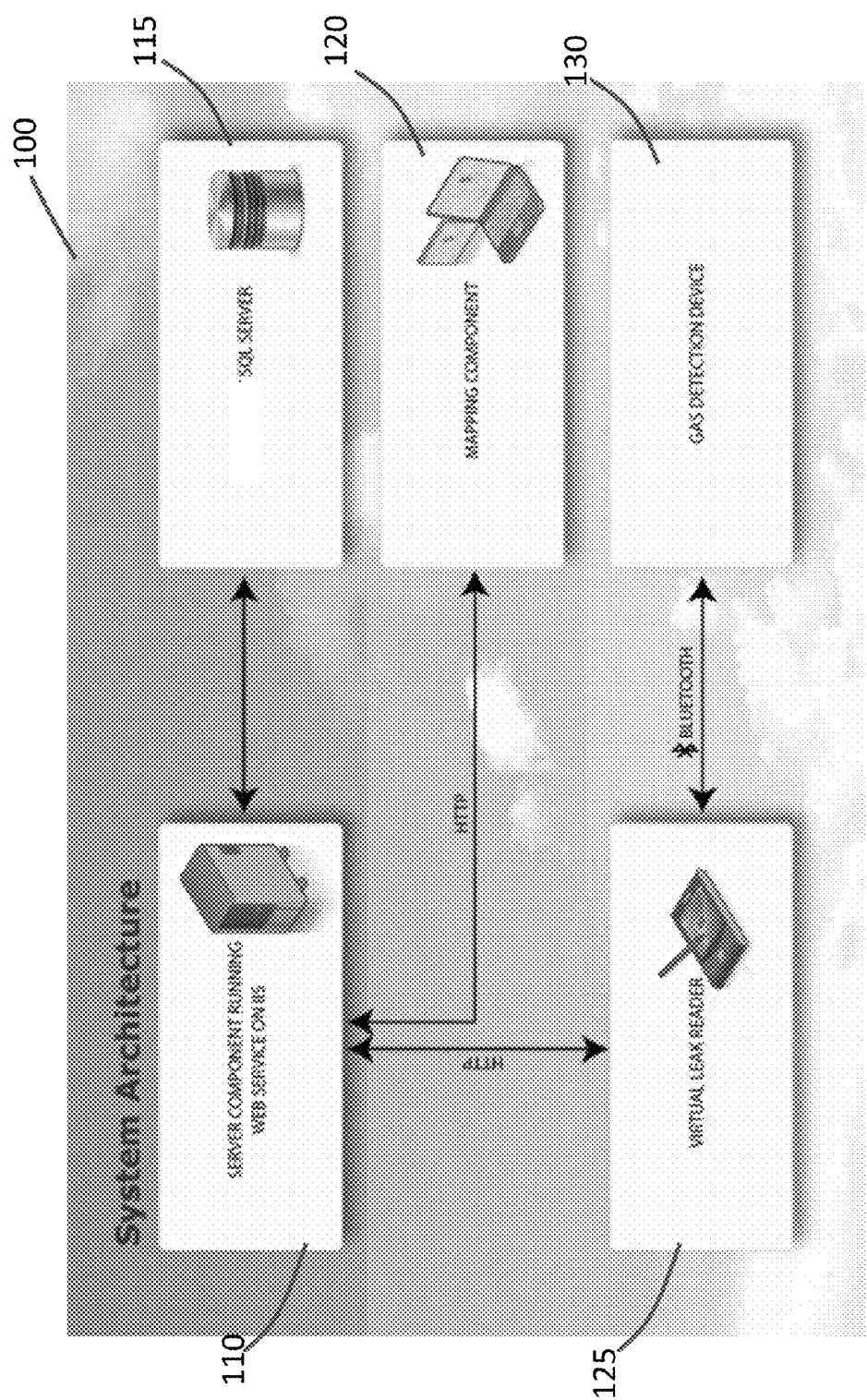
FIG. 1 illustrates system architecture of the hazardous gas monitoring training system and method in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments of the invention include an alternative to life gas training by providing a hazardous gas monitoring training system and method which deploys a combination of virtual training tools and mobile communications systems. Some embodiments of the invention include a hazardous gas monitoring training system and method can simulate live gas leaks in real world planned areas using real gas meter testers or mock-ups of gas meter testers, providing a virtual leak surveyor training simulator. In some embodiments, the virtual leak surveyor training simulator can be configured to provide one or more virtual leaks that can be registered as being detected using a real gas detection device or other conventional commercial gas meter tester. Some embodiments include a hazardous gas monitoring training system and method that can include a trainer control unit configured with a user interface that can provide leak location and properties configured by the trainer. In some embodiments, this can include GPS location, gas concentration, and gas plume radius.

FIG. 1 illustrates example system architecture 100 of a hazardous gas monitoring training system and method in accordance with some embodiments of the invention. Some embodiments include a server system 110 coupled to a storage server 115 that can generate and control a hazardous gas monitoring training system and method. The system architecture 100 includes one or more dedicated and/or integrated physical gas detection devices, conventional commercial gas meter testers, or other portable training devices (shown in FIG. 1 as gas detection device 130). In some embodiments, the gas detection device 130 can be coupled to the server system 110 using a virtual leak reader 125. In some embodiments, the gas detection device 130 and virtual leak reader 125 are coupled through a wireless coupling (e.g., such as Bluetooth®). Bluetooth® is a registered trademark owned by Bluetooth®SIG. In other embodiments, the gas detection device 130 and virtual leak reader 125 are coupled through a wired coupling. In some further embodiments, the gas detection device 130 and virtual leak reader 125 are integrally coupled. In some embodiments, the server system 110 and virtual leak reader 125 are coupled through a wireless coupling. In other embodiments, the server system 110 and virtual leak reader 125 are coupled through a wired coupling.

In some embodiments, a mapping component 120 can be coupled with and can communicate with the server 110 and the storage server 115. In some embodiments, the mapping component 120 can enable the server system 110 to process virtual maps and to store any virtual leaks created within the system architecture 100. In some embodiments of the invention, the system architecture 100 can include interaction and operation of a server with a web component including IIS protocols and a database server to enable storage of the virtual leaks and associate scenario information described earlier. In some embodiments, the hazardous gas monitoring training system and method does not require connecting to the Internet because the system architecture 100 can be hosted by a user's stand-alone computer system (such as a desktop PC or a laptop). In some embodiments, server 110 and mapping components 120 can be run on the same desktop PC or a laptop, and used within a training base to generate virtual leak scenarios while communicating with one or more gas detectors 130 handled by the user (e.g., such as a trainee).

Figure 2:
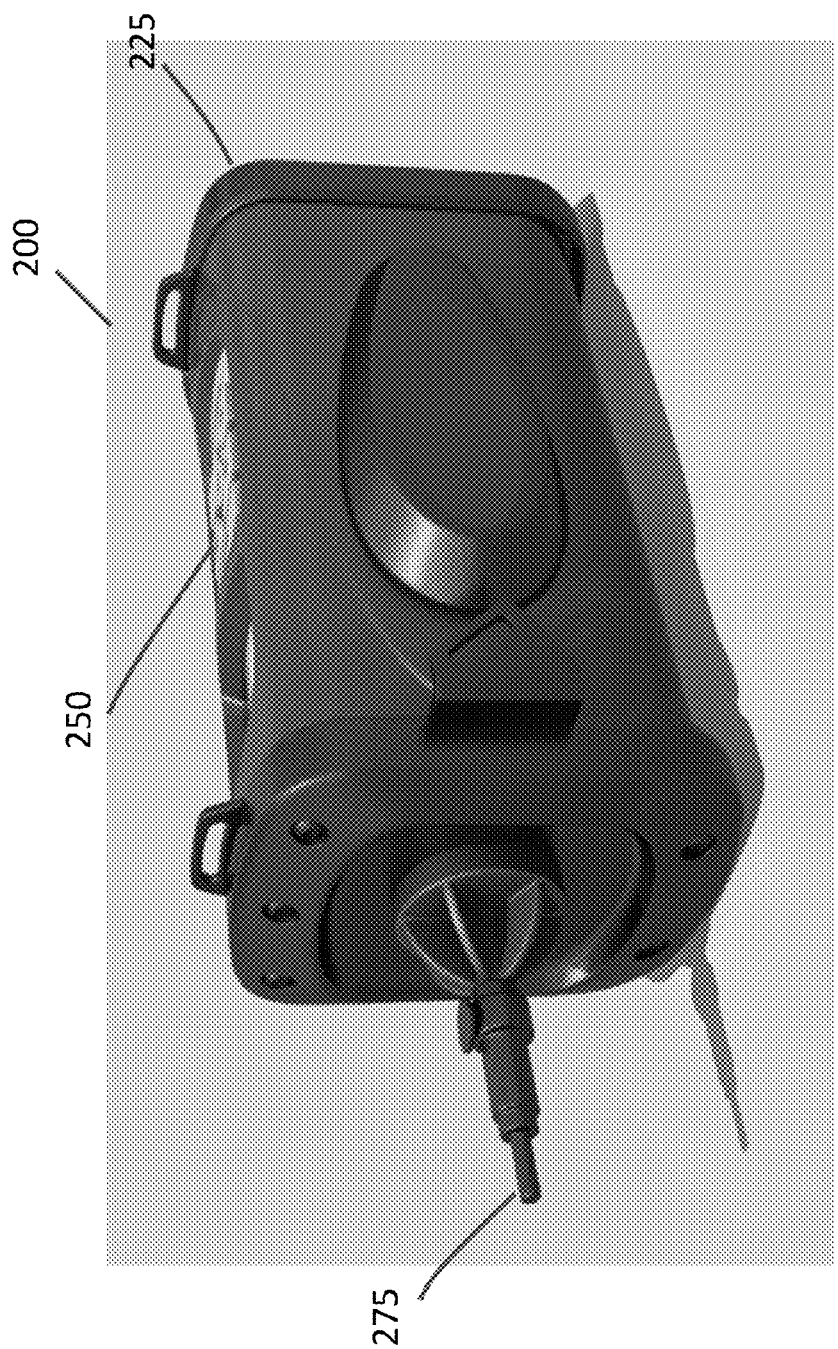
FIG. 2 illustrates a hazardous gas sensor tool used within the hazardous gas monitoring training system and method in accordance with some embodiments of the invention.
Figure 3:
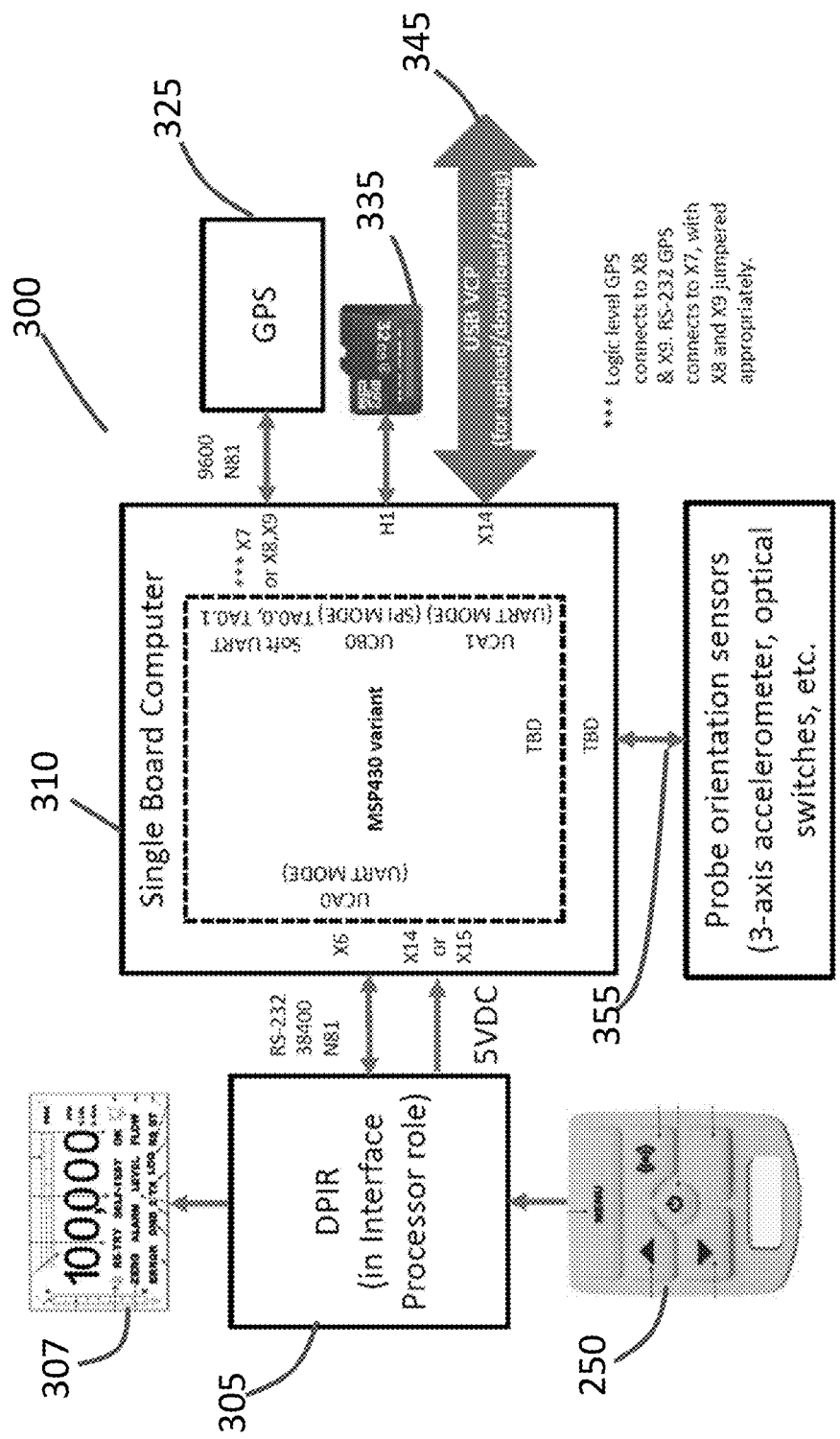
FIG. 3 provides a control system used in the hazardous gas monitoring training system and method in accordance with some embodiments of the invention.

Referring to FIG. 2, illustrating a hazardous gas sensor tool 200 (e.g., such a gas detection devices based on infra-red light detection), in some embodiments, one or more trainee personnel can be equipped with the gas sensor tool 200, and a training scenario can be initiated by the system architecture 100 as part of a hazardous gas monitoring training system and method. For example, in some embodiments, the gas detection device 130 shown in the system architecture 100 of FIG. 1 can comprise the gas sensor tool 200 and/or the virtual leak reader 125 that can be configured to exchange data with the server 110. Some embodiments of the invention include a trainee device or good comprising a gas sensor tool 200 that comprises a housing 225 and an actual or mock probe 275. For example, in some embodiments, the gas sensor tool 200 can comprise a device or good comprising an actual modified or unmodified convention gas detection device. In other embodiments, the gas sensor tool 200 can comprise a mock-up of an actual convention gas detection device. For realism, the mock-up can appear the same or similar to any conventional gas detection device. In some embodiments, when integrated with and/or coupled to a mobile communication system, the one or more gas sensor tools 200 can form part of a hazardous gas monitoring training system and method configured to operatively link during a training scenario hosted within the system architecture 100 at least partially by the server 110. In some embodiments, the hazardous gas monitoring training system and method can include a gas sensor tool 200 simulator (i.e., simulating a real gas detection device or other commercial gas meter testers) coupled to the gas sensor tool 200 (real gas detection devices or other commercial gas metering systems). For example, FIG. 3 provides a control system 300 that can function as part of the hazardous gas monitoring training system and method in accordance with some embodiments of the invention. In some embodiments, a processor of the gas sensor tool 200 can be programmed as an interface processor under control of a single-board computer 310 ("SBC"). In some embodiments, the SBC 300 can be coupled to a GPS module 325 that can be configured to provide GPS data to enable location of the gas sensor tool 200. In some embodiments, the SBC 300 can include storage capability and one or more industry standard communication ports. For example, in some embodiments, the SBC 300 can include data storage 335 and/or USB data transfer 345. In some embodiments, the gas sensor tool 200 can include a low-level interface 305 to a LCD display 307 and/or a keypad (shown as 250), a battery gauge, an alarm, and a pump, etc. In some embodiments, the SBC 300 can control the interface 305, operate the GPS module 325, determine the PPM display, log trainee interaction, and determine probe orientation, etc. Further, various data from the device 130 can be communicated using interface 355, including, but not limited to, probe orientation (e.g., the orientation of the probe 275, data from one or more three-axis accelerometers, optical switches, and other sensors, etc.) Further, in some embodiments, the SBC 300 can interface to a host computer to download PPM relationship mapping, and upload trainee interaction logs. In some embodiments, the control system 300 can communicate using a standard HTTP network protocol using Bluetooth®, WiFi communications, and one or more cellular bands and networks. In some embodiments, communication and data transfer protocols of the hazardous gas monitoring training system and method can include using a standard HTTP network protocol using Bluetooth®, WiFi communications, and one or more cellular bands and networks.

Figure 4A:
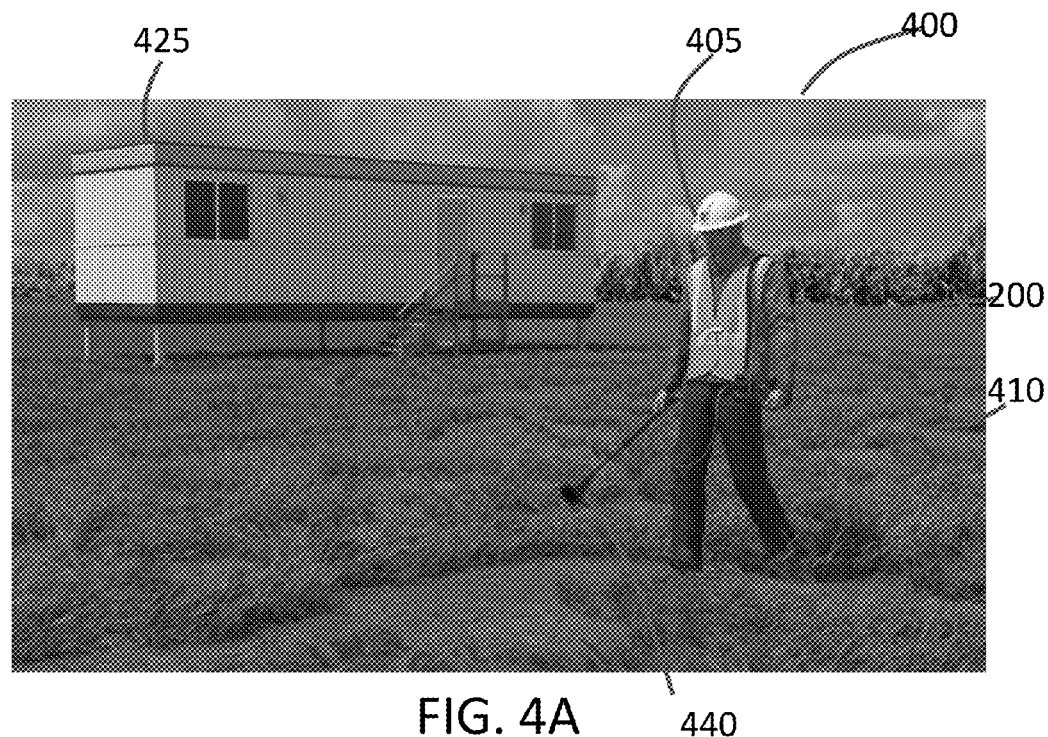
FIG. 4A illustrates a view of a trainee engaged in the hazardous gas monitoring training system and method in accordance with some embodiments of the invention.
Figure 4B:
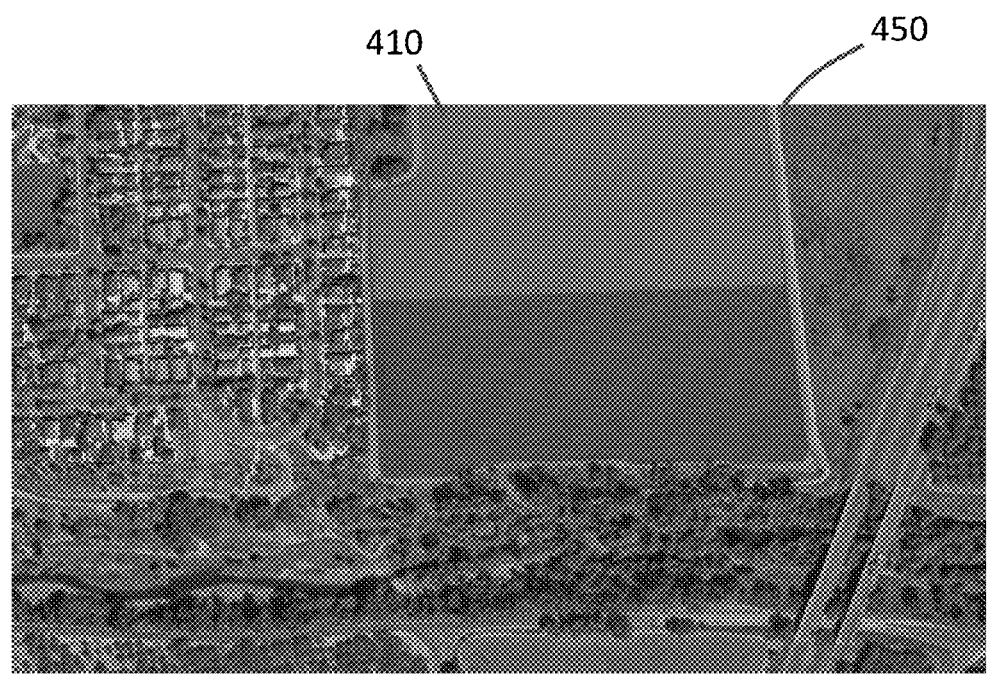
FIG. 4B illustrates an aerial view of a training simulation site in accordance with some embodiments of the invention.
Figure 5:
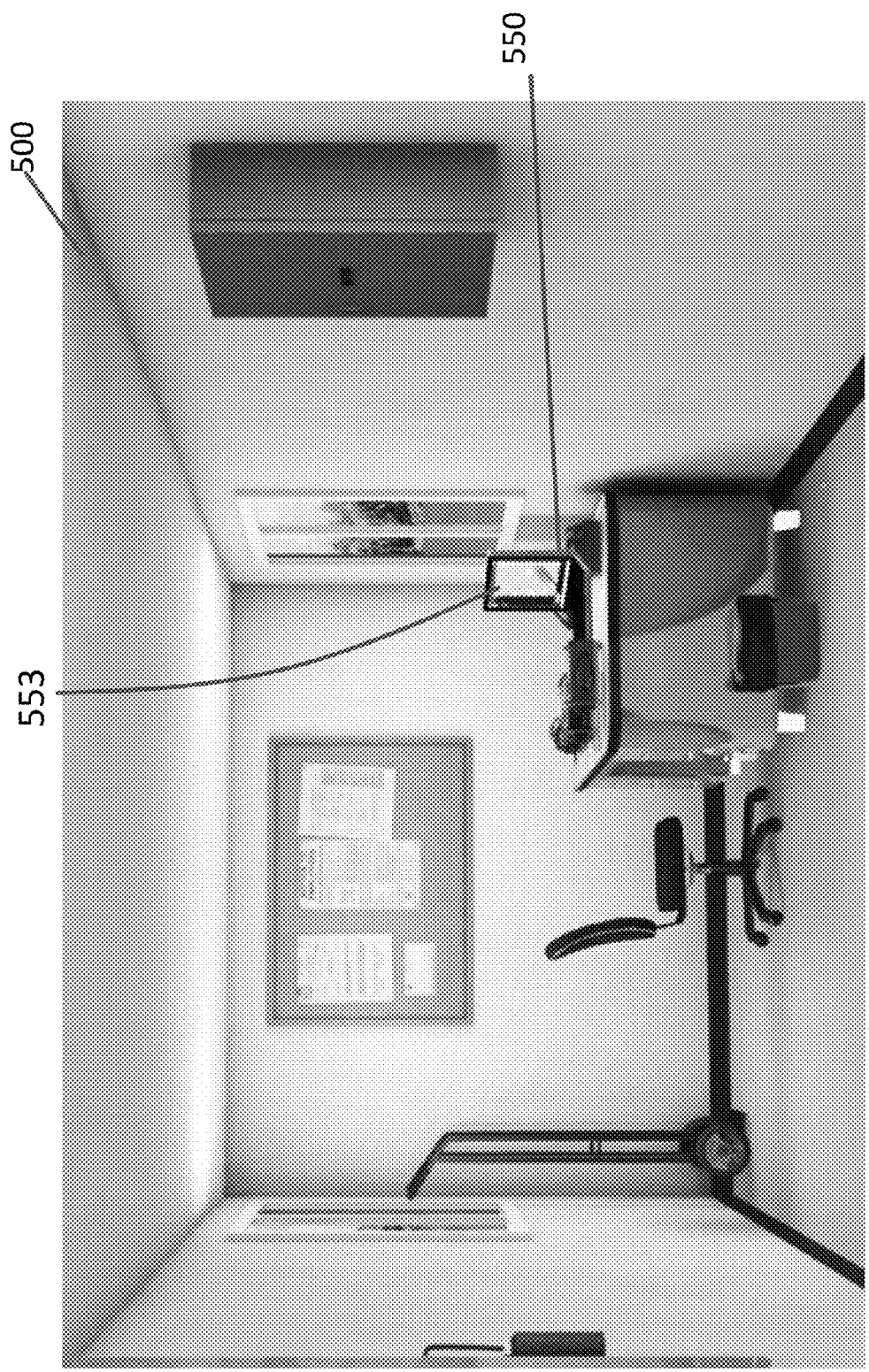
FIG. 5 illustrates a representation of a control room for the hazardous gas monitoring training system and method in accordance with some embodiments of the invention.

FIG. 4B illustrates an aerial view 450 of an actual training simulation site in accordance with some embodiments of the invention, and FIG. 4A illustrates a view 400 of a trainee 405 engaged within a training area 410 in the hazardous gas monitoring training system and method in accordance with some embodiments of the invention. Trainee 405 is shown exploring the area 410 adjacent to the command trailer 425, with gas sensor tool 200 (shown with coupled probe extension 440). FIG. 5 illustrates a representation of a control room 500 for the hazardous gas monitoring training system and method in accordance with some embodiments of the invention. In some embodiments, the control room 500 is within the command trailer 425. In some embodiments, the system architecture 100 can include user's computer system 550 including user display 553 through which a user (e.g., such as a trainer) can view, develop, and monitor one or more training scenarios. In some embodiments, this can be accomplished using a graphical user interface (hereinafter "GUI") on the user display 553 to view a simulated or actual simulation site (e.g., such as aerial view 450), where a user (e.g., a trainer) can host and/or monitor a view 400 of a trainee 405 engaged within a training area 410 in the hazardous gas monitoring training system and method. In some embodiments, the views 400, 450 can be actual views (e.g., from still or moving image data). In other embodiments, the views 400, 450 can be simulated based on the physical location of a trainee represented as trainee 405. In some further embodiments, the views 400, 450 can comprise real and simulated imagery.

Figure 6:
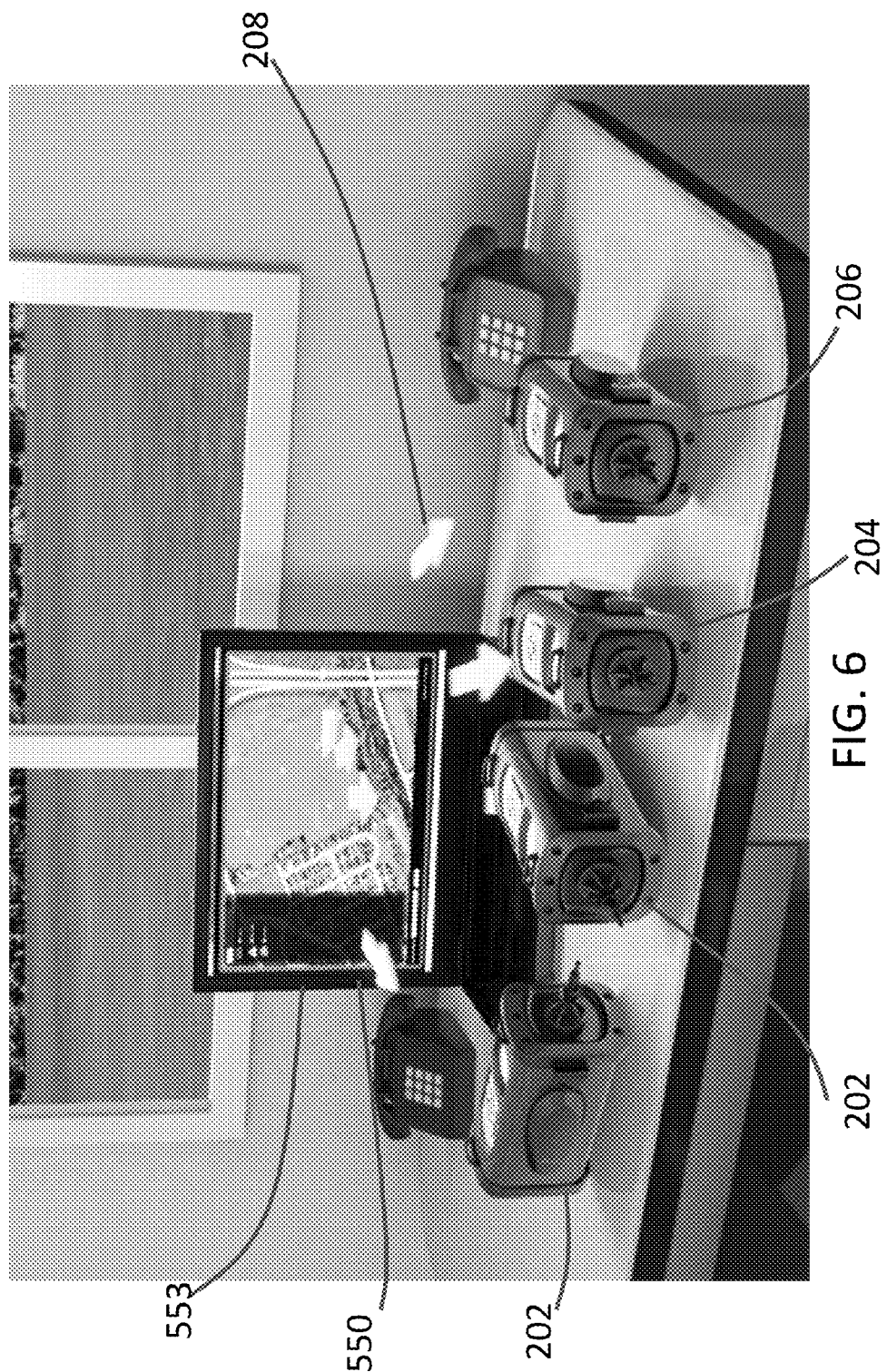
FIG. 6 illustrates an example of training scenario planning and programming within the hazardous gas monitoring training system and method in accordance with some embodiments of the invention.

In some embodiments of the invention, one or more virtual leaks can be created as part of a training scenario by the server 110 and mapping components 120 run on the same desktop PC or a laptop (e.g., the user's computer system 550) and used within a training base simulator to generate virtual leak scenarios while communicating with one or more gas detectors 130 handled by an operator (e.g., such as a trainee 405). Further, in some embodiments, the user can create as many scenarios as required to cover different training objectives. For example, in some embodiments, the hazardous gas monitoring training system and method can deploy the mapping component 120 to enable the user to create a virtual leak and specify one or more leak locations using GPS coordinates on a virtual map processed by the system architecture for display on the computer system 550. In some embodiments, using GPS location, the user can interact with the map 553 shown displayed by the computer system 550 (e.g., using a mouse or keyboard, touch screen, or using a tablet or other touch screen-enabled computer, or a mobile computing device such as a smart phone). In some embodiments, computer system 550 can pair or couple (represented as arrows 560) with one or more gas sensor tools 200 such as any one or more of the gas sensor tools 202, 204, 206, 208 shown in FIG. 6. As part of a training exercise, one or more trainees 405 can carry or transport one or more of the gas sensor tools 202, 204, 206, 208 to a designated training location (e.g., such as a training area 410 shown in FIGS. 4A and 4B).

Figure 7:
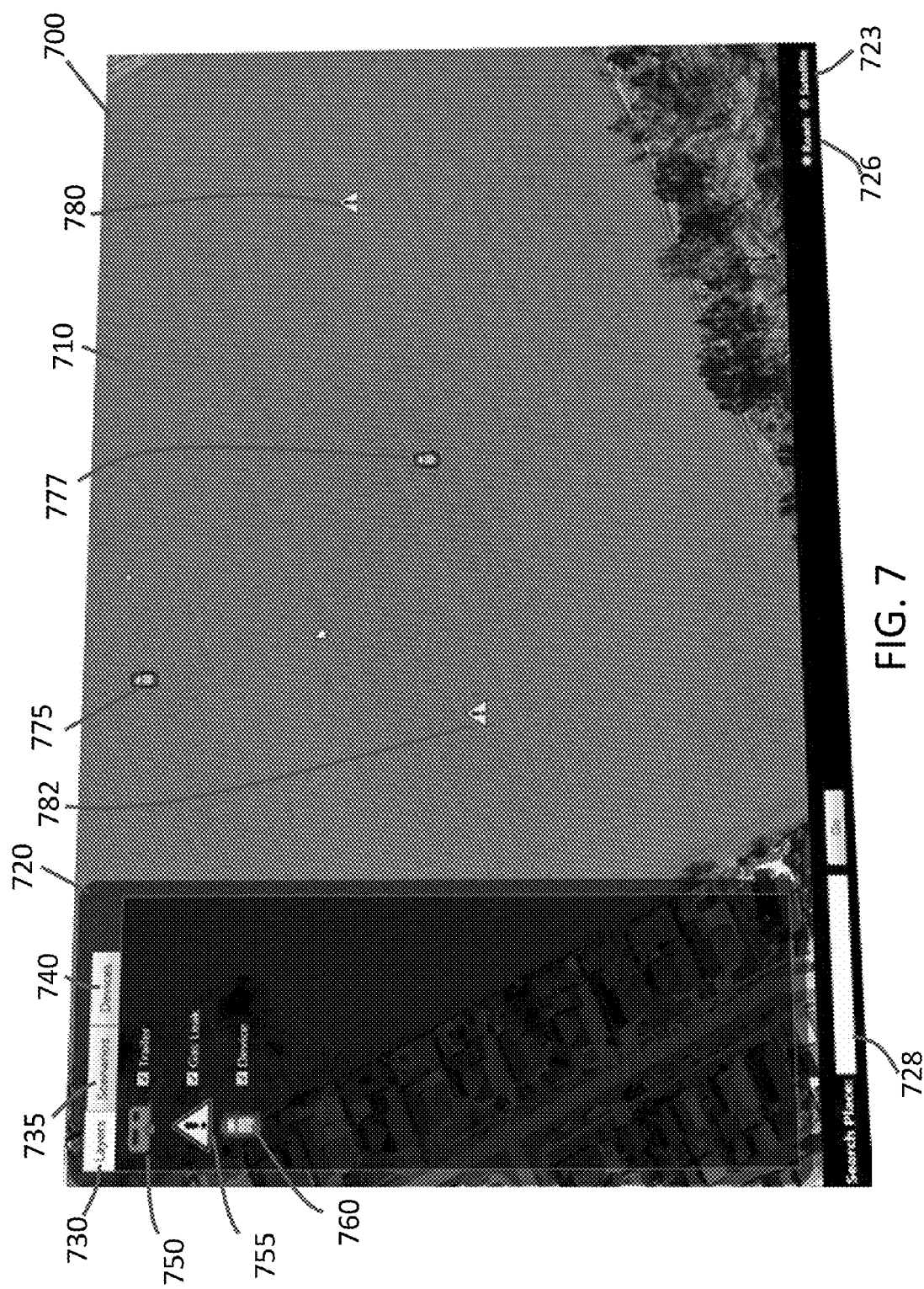
FIG. 7 illustrates a GUI display of a module of the hazardous gas monitoring training system and method in accordance with some embodiments of the invention.
Figure 8:
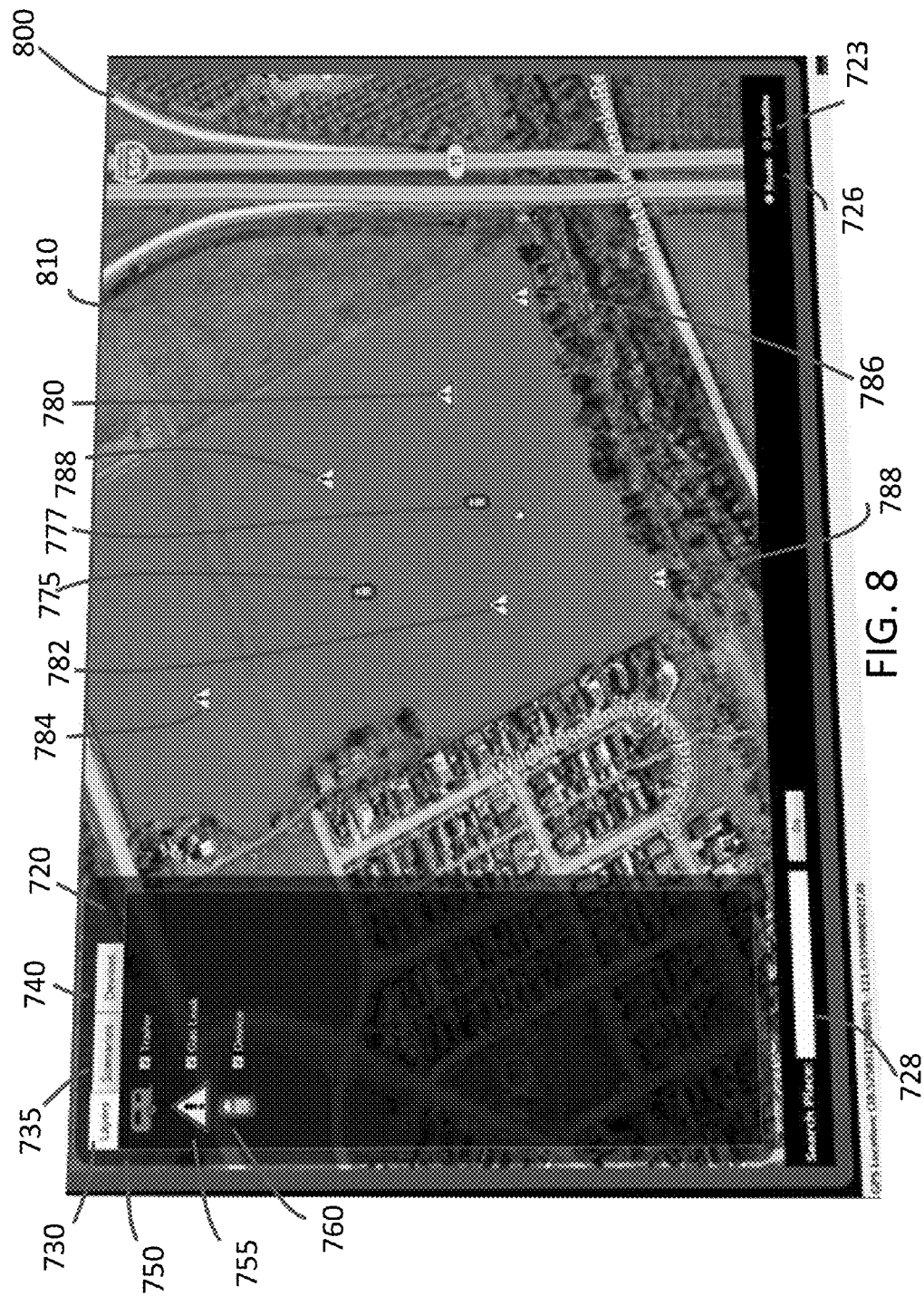
FIG. 8 illustrates a GUI display of a module of the hazardous gas monitoring training system and method in accordance with some embodiments of the invention.

In some embodiments, the system architecture 100 can display at least a partial view of the training area 410 (e.g., as user-selectable views 400, 450). In some embodiments, the user can zoom into any region of the training area 410, display a virtual or actual view of the trainee 405 (e.g., such as shown in view 400), and/or display a GPS location of the trainee 405. For example, FIGS. 7 and 8 illustrate GUI displays 700, 800 of a training module of the hazardous gas monitoring training system and method generated by the system architecture 100 in accordance with some embodiments of the invention. Referring to GUI display 700 of FIG. 7, in some embodiments, a map display 710 can be displayed showing the positions of one or more trainees and/or one or more gas leaks or other gas hazards or infrastructure. In some embodiments, GUI display 700 can include a various fields, windows, toggles and/or selectable tabs through which a user can control various aspects of the GUI display 700. For example, a field 728 can be included to enable a user to search a place, and selectors 726, 728 can be used to control the detail of the map display 710. For example, a roads selector 726 can be used to toggle the display of roads, and satellite selector 723 can be used to toggle between a simulated map, and one or more satellite-derived images that can be display, overlaid, or blended with a simulated map.

Some embodiments include a menu window 720 that can include various fields, windows, toggles and/or selectable tabs through which a user can control the map display 710 and develop, control, and/or monitor one or more gas training exercises. For example, using the computer system 550 in the control room 500 of FIG. 5, a trainer can view, develop, and monitor one or more training scenarios. In some embodiments, the menu window 720 can include a layers menu 730 to enable a user to select and/or toggle through one or more layers in the map display 710. Further, in some embodiments, a scenario menu 735 can be used to select, develop, view, and/or store one or more training scenarios. Further, in some embodiments, a devices menu 740 can be used to select, develop, view, and/or store one or more devices in one or more training scenarios. Further, in some embodiments, a trailer selector 750 can be used to select or toggle a trailer display on the map display 710. In some embodiments, in some embodiments, one or more leaks can be designated by a user (e.g., a trainer) in one or more areas of the map. In some embodiments, one or more pop-up boxes can be provided to enable the user to provide details of the one or more virtual leaks. For example, in some embodiments, the user can enter the type of hazardous material, the extent of the leak, and other details as required. For example, in some embodiments, a gas leak selector 755 can be used to select or toggle a gas leak on the map display 710. Further, in some embodiments, a device selector 760 can be used to select or toggle a device display on the map display 710. As shown on the non-limiting embodiment of FIG. 7, the map display 710 can include the position of one or more trainees (e.g., such as trainee 405 shown in FIG. 4A). For example, in some embodiments, map display 710 can include trainee indicator 775 and trainee indicator 778 representing the position of a first and second trainee. In some embodiments, virtual or simulated gas leaks can be initiated, selected and/or positioned on the map display 710. For example, the non-limiting example embodiment of FIG. 7 shows two gas leaks comprising gas leak 780 and gas leak 782, and the first and/or the second trainee (trainee indicators 775, 778) can be directed to discover, detect, and/or monitor the gas leak 780 and/or the gas leak 782.

In some embodiments, map interaction can be provided to the user by panning and zooming functions. In some embodiments, the user can load a map of the relevant area by providing a location search string for an area of interest (e.g., such as a GPS location string) (e.g., using field 728). In reference to display map 810 of FIG. 8, the user can zoom out of the map display 710. Within this non-limiting example embodiment, in addition to trainee indicator 775, trainee indicator 778, and gas leaks 780, 782, further gas leaks are shown including gas leak 784, gas leak 786, and gas leak 788. In some embodiments, any one or all of the gas leaks 782, 784, 786, 788 can be used to train trainees indicated by trainee indicators 775, 778, and/or other trainees 405 who are positioned beyond the boundaries of the map display 810, or who yet to enter the training simulation.

Figure 9:
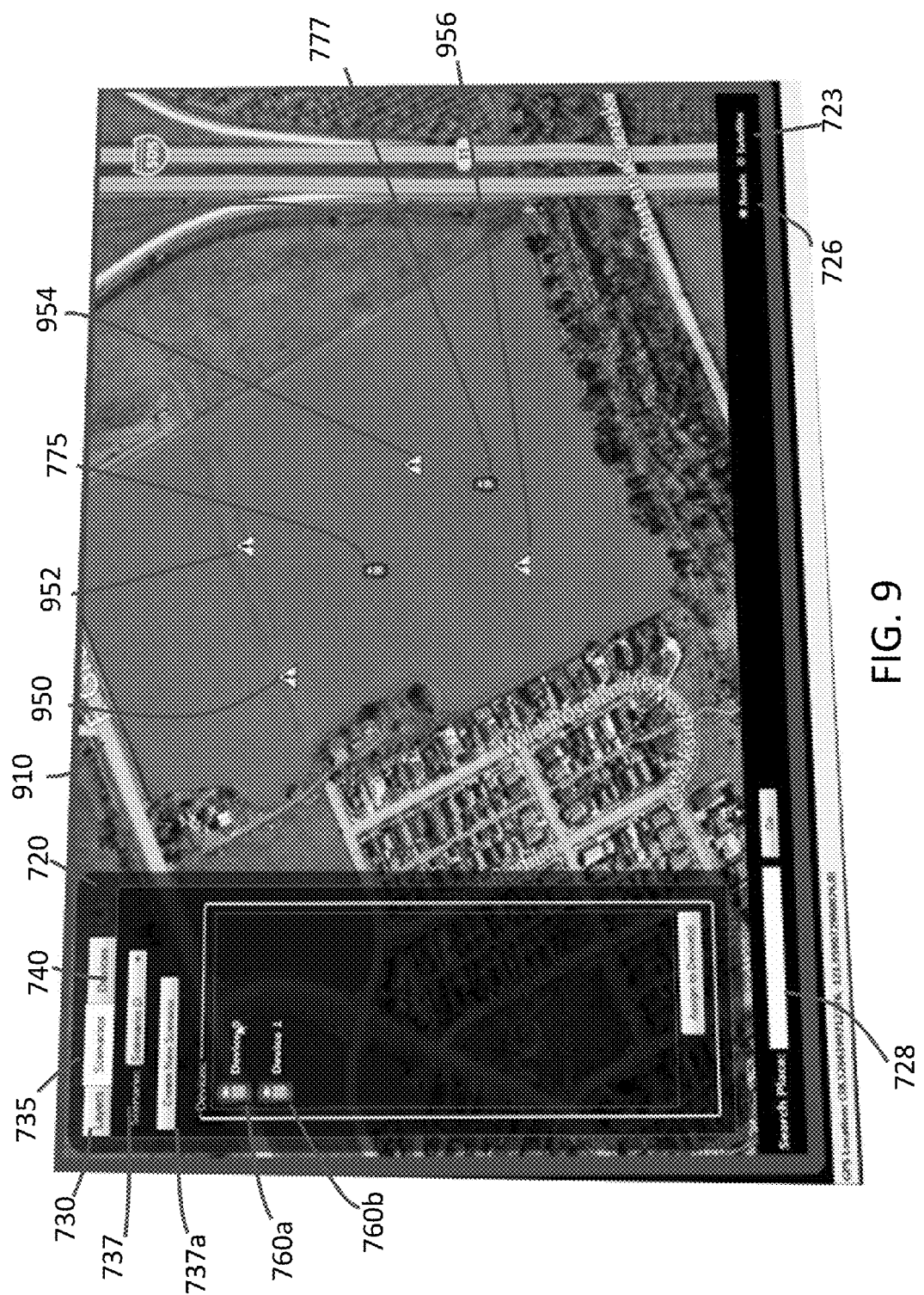
FIG. 9 illustrates a screen shot of a scenario planning module of the hazardous gas monitoring training system and method in accordance with some embodiments of the invention.

In some embodiments, different planning scenarios can be established for different gas sensor tools. For example, FIG. 9 illustrates an example of training scenario planning and programming within the hazardous gas monitoring training system and method in accordance with some embodiments of the invention. As an example, in some embodiments, within the map display 910, a first scenario can be initiated using the scenario menu 735. Some embodiments include a scenarios selector 737 that can be used to select a scenario that can be created using the creation selector 737a. One or more scenarios can then be assigned to one or more devices using device assignment selectors 760a, 760b. In some embodiments, ten virtual gas leaks can be used within a scenario. Other scenarios can be programmed with more or less numbers of gas leaks. Further, in some embodiments, a second scenario can be similarly created, and but can consist of five virtual leaks. Other scenarios can be programmed with more or less numbers of gas leaks. In some embodiments, a user can then assign the scenario to a specific gas sensor tool (e.g., such as any of the gas tools 202, 204, 206, 208 shown in FIG. 6), each of which can be assigned to one or more trainees 405. In some embodiments, the system architecture 100 can enable each trainee 405 to enter the scenario individually, or can be configured to run more than one scenario simultaneously. Further, in some embodiments, more than one scenario can be assigned to a specific gas sensor tool. For example, in some embodiments, the first and second scenarios can be assigned to a first gas sensor tool (such as tool 202), and a third scenario can be created and assigned to the second gas sensor tool (e.g., such as any one of the tools 204, 206, 208), and so on.

In some embodiments, through the use of the aforementioned communication protocols, any gas sensor tool (e.g., such as any of the tools 202, 204, 206, 208) can communicate with other components of the system architecture 100 (e.g., through the virtual leak reader 125), and simulation logic can react to the surveyor (i.e., the trainee) moving within a scenario zone and away or towards the leak zone, and thereby updating the mapping interface substantially in real time. For example, in some embodiments, if a trainee 405 represented by trainee indicator 775 and/or a trainee indicator 778 moves within an area represented by the map displays 710, 810, 910, the position of the trainee indicators 775, 778 will be updated by the server system 110 using data from the mapping component 120 as required to updated the map displays 710, 810, 910 based on the position of the trainee 405 (provided by GPS module 325) and/or based on the user's input or selection (e.g., such as movement or zooming in or out) within the map displays 710, 810, 910.

Figure 10:
FIG. 10 illustrates a screen shot of a live training scenario with a view of a trainee engaged in the hazardous gas monitoring training system and method in accordance with some embodiments of the invention.

In some embodiments, the user can follow the progress of one or more trainees suing a live or simulated view of the trainee 405. For example, FIG. 10 illustrates a screen shot of a live training scenario with a view of a trainee 405 engaged in the hazardous gas monitoring training system and method in accordance with some embodiments of the invention. The map view of the training simulation is shown in the map display 1010, with the trainee view window 1050 shown overlaid. The position of the trainee 405 represented or viewed in window 1050 can be shown in the map display 1010 as needed. Further, in this non-limited embodiment, gas leak 1060 and gas leak 1062 is shown, with an emergency vehicle 1070 shown in proximity to gas leak 1062, with command trailer 1075 adjacent to the gas leak 1062. In some embodiments, the command trailer 1075 represents the command trailer 425 (which includes the control room 500 shown in FIG. 5). In other embodiments, the control 500 can be any location designated by the user. In some embodiments, menu 742 can enable a user to view and remove one or more devices from a scenario.

In some embodiments, a virtual information map can be communicated to the trainee 405. For example, in some embodiments, the trainee 405 can receive mapping information (showing relative position within the training area). In some further embodiments, the trainee 405 can receive virtual leak mapping information. In some embodiments, the one or more maps similar to or identical to the map displays 710, 810, 910 can be communicated to the trainee 405. For example, in some embodiments, the trainee 405 can receive information regarding a virtual plume based on one or more areas of the plume previously tracked by the trainee 405. In some embodiments, this information can be provided to the trainee 405 using a wearable device (e.g., as a virtual reality helmet or virtual projection heads-up display, glasses or goggles). In some embodiments, this information can be displayed to the trainee 405 substantially in real time as the trainee 405 is tracking one or more hazardous leaks points, vents, or plumes (e.g., such as shown in map displays 710, 810, 910).

Figure 11:
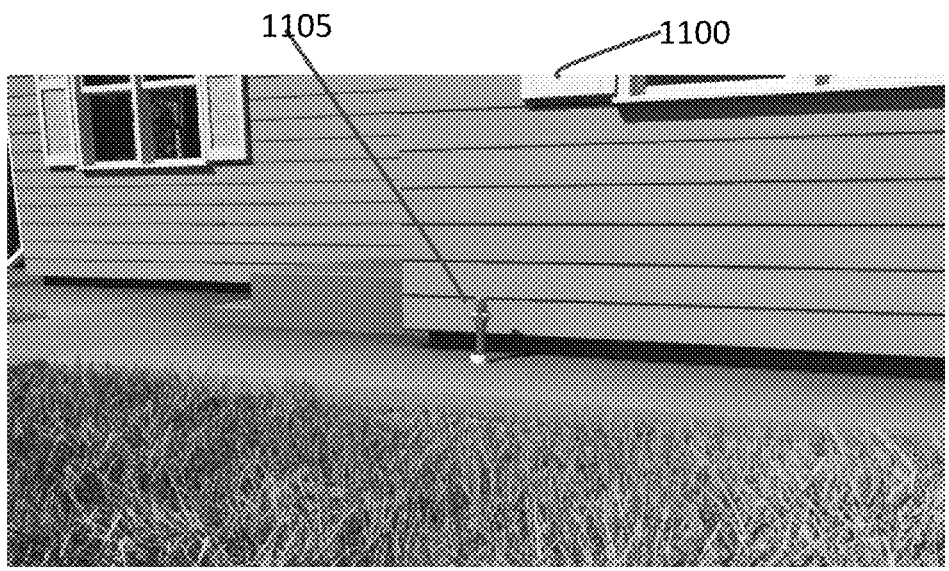
FIG. 11 illustrates a view of an example site that can be monitored by personnel training using the hazardous gas monitoring training system and method in accordance with some embodiments of the invention.
Figure 12:
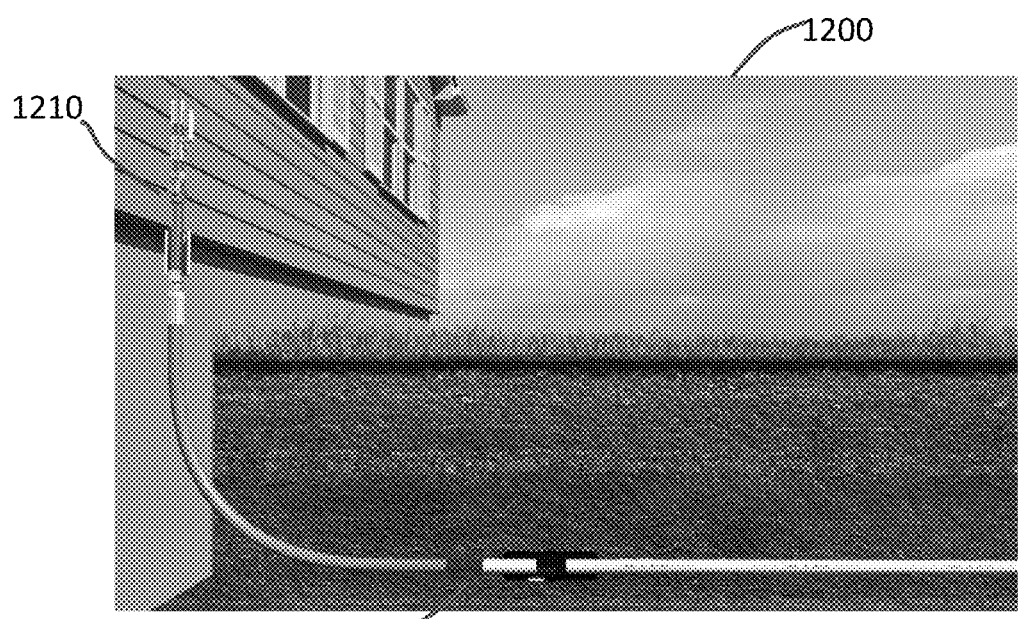
FIG. 12 illustrates a view of an example site that can be monitored by personnel training using the hazardous gas monitoring training system and method in accordance with some embodiments of the invention.

FIGS. 11 and 12 illustrate views of example sites that can be monitored by personnel training using the hazardous gas monitoring training system and method in accordance with some embodiments of the invention. Sites can include residential and business gas conduits and metering systems, as well as underground systems that can be susceptible to earthquakes and other ground disturbances. These types of real world leak sites can be implemented virtually by the hazardous gas monitoring training system and method to enable a trainee to safely and effectively monitor these kinds of sites in the real world. For example, some non-limiting embodiments can include a gas conduit 1105 from residence 1100 and/or a gas piping 1205 of building 1210. In some embodiments, any one or both of the residence 1100 and building 1210 can be represented in the map region 1090 shown in the map display 1010. In some embodiments, a user can select a gas leak positioned in this map region 1090 that maps to a residence 1100 and building 1210 that is located in the map region 1090 of the map display 1010.

Figure 13:
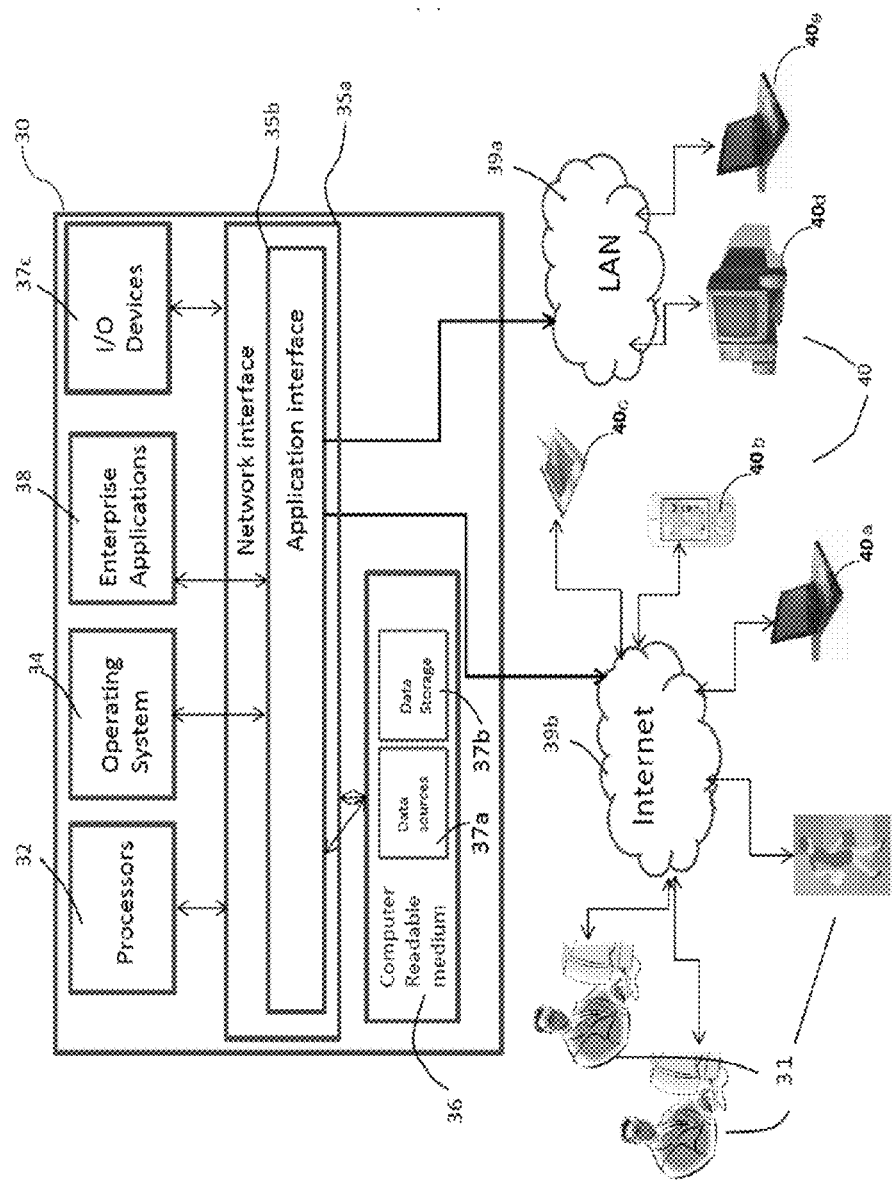
FIG. 13 illustrates a computer system used by the system architecture of the hazardous gas monitoring training system and method in accordance with some embodiments of the invention.

FIG. 13 shows one example of a computer system 30 implementation useful for performing one or more of the methods of the hazardous gas monitoring training system within the system architecture 10 shown in FIG. 1. In some embodiments, the server system 110 can be embodied by the computer system 30 or can be coupled to the computer system 30. In some embodiments, the computer system 30 can include at least one computing device, including at least one or more processors 32. Some processors 32 can include processors 32 residing in one or more conventional server platforms (such as the server 120 handling the mapping components). The computer system 30 can include a network interface 35*a* and an application interface 35*b* coupled to at least one processors 32 capable of running at least one operating system 34. Further, the computer system 30 can include a network interface 35*a* and an application interface 35*b* coupled to at least one processors 32 capable of running one or more of the software modules (e.g., enterprise applications 38). In some embodiments, the software modules 38 can include server-based software platform that can include hazardous gas monitoring training system and method software modules suitable for hosting at least one user and/or user account, as well as transferring data between one or more accounts. In some embodiments, the mapping component 120 can be a component of the computer system 30. In some embodiments, the software modules 38 can comprise the mapping component 120.

Some embodiments of the invention also relate to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general purpose computer selectively activated or configured by one or more computer programs stored in the computer memory, cache, or obtained over a network. When data are obtained over a network the data can be processed by other computers on the network, e.g. a cloud of computing resources.

With the above embodiments in mind, it should be understood that the invention can employ various computer-implemented operations involving hazardous gas monitoring training system and method data stored in computer systems. Moreover, the above-described databases and models throughout the hazardous gas monitoring training system and method can store analytical models and other data on computer-readable storage media within the computer system 30 and on computer-readable storage media coupled to the computer system 30. In addition, the above-described applications of the hazardous gas monitoring training system and method can be stored on computer-readable storage media within the computer system 30 and on computer-readable storage media coupled to the computer system 30. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated.

Some embodiments include the computer system 30 comprising at least one computer readable medium 36 coupled to at least one data storage device 37*b*, and/or at least one data source 37*a*, and/or at least one input/output device 37*c*. In some embodiments, the at least one computer readable medium 36 can comprise the storage server 115. In some embodiments, the invention embodied by the hazardous gas monitoring training system and method can also be embodied as computer readable code on the computer readable medium 36. The computer readable medium 36 can be any data storage device that can store data, which can thereafter be read by a computer system (such as the computer system 30). Examples of the computer readable medium 36 can include hard drives, network attached storage (NAS), read-only memory, random-access memory, FLASH based memory, CD-ROMs, CD-Rs, CD-RWs, DVDs, magnetic tapes, other optical and non-optical data storage devices, or any other physical or material medium which can be used to tangibly store the desired information or data or instructions and which can be accessed by a computer or processor (including processors 32).

In some embodiments of the invention, the computer readable medium 36 can also be distributed over a conventional computer network via the network interface 35a so that the hazardous gas monitoring training system and method embodied by the computer readable code can be stored and executed in a distributed fashion. For example, in some embodiments, one or more components of the computer system 30 can be tethered to send and/or receive data through a local area network ("LAN") 39a. In some further embodiments, one or more components of the computer system 30 can be tethered to send or receive data through an internet 39b (e.g., a wireless internet). In some embodiments, at least one software application 38 running on one or more processors 32 can be configured to be coupled for communication over a network 39a, 39b. In some embodiments, one or more components of the network 39a, 39b can include one or more resources for data storage, including any other form of computer readable media beyond the media 36 for storing information and including any form of computer readable media for communicating information from one electronic device to another electronic device.

In some embodiments, the network 39a, 39b can include wide area networks ("WAN"), direct connections (e.g., through a universal serial bus port) or other forms of computer-readable media 36, or any combination thereof. Further, in some embodiments, one or more components of the network 39a, 39b can include a number of client devices which can be personal computers 40 including for example desktop computers 40d, laptop computers 40a, 40e, digital assistants and/or personal digital assistants (shown as 40c), cellular phones or mobile phones or smart phones (shown as 40b), pagers, digital tablets, internet appliances, and other processor-based devices. In general, a client device can be any type of external or internal devices such as a mouse, a CD-ROM, DVD, a keyboard, a display, or other input or output devices 37c. In some embodiments, various other forms of computer-readable media 36 can transmit or carry instructions to a computer 40, including a router, private or public network, or other transmission device or channel, both wired and wireless. The software modules 38 can be configured to send and receive data from a database (e.g., from a computer readable medium 36 including data sources 37a and data storage 37b that can comprise a database), and data can be received by the software modules 38 from at least one other source. In some embodiments, at least one of the software modules 38 can be configured within the system to output data to a user 31 via at least one digital display (e.g., to a computer 40 comprising a digital display). In some embodiments, the user's computer system 550 comprises the computer 40.

In some embodiments, the computer system 30 as described can enable one or more users 31 to receive, analyze, input, modify, create and send data to and from the computer system 30, including to and from one or more enterprise applications 38 running on the computer system 30. Some embodiments include at least one user 31 coupled to a computer 40 accessing one or more modules of the hazardous gas monitoring training system and method including at least one enterprise applications 38 via a stationary I/O device 37c through a LAN 39a. In some other embodiments, the computer system 30 can enable at least one user 31 (through computer 40) accessing enterprise applications 38 via a stationary or mobile I/O device 37c through an internet 39a.

The embodiments of the present invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A gas training system comprising:
    at least one computing device or server coupled to a mapping component;
    at least one virtual leak detector coupled to the at least one computing device or server, the at least one virtual leak detector configured to communicate at least one location or GPS position data;
    at least one trainee device or good coupled with the at least one virtual leak detector, the at least one trainee device or good discoverable by the at least one computing device or server;
    a non-transitory computer readable medium coupled to the at least one computing device or server, having stored thereon, instructions that when executed by the at least one computing device or server, cause the at least one computing device or server to perform operations comprising at least:
        retrieving at least one map and/or image from the mapping component representing at least one actual training area or location;
        based at least in part on the at least one location or GPS position data received from the at least one virtual leak detector, displaying at least one map or map image including a representation of the at least one trainee device or good in a position on the at least one map or map image based at least in part on the actual physical location of the at least one trainee device or good; and displaying a real-life view of a trainee carrying the at least one virtual leak detector or simulated life-like representation of the trainee at least one virtual leak detector.

2. The system of claim 1, wherein the at least one trainee device or good comprises an actual or mock gas detector.

3. The system of claim 1, wherein the at least one virtual leak detector comprises the at least one trainee device or good.

4. The system of claim 1, wherein the at least one virtual leak detector is integrated or coupled with the at least one trainee device or good.

5. The system of claim 1, wherein the GPS position data comprises data or signals from a GPS unit coupled to or integrated with the at least one trainee device or good.

6. The system of claim 1, further comprising the at least one computing device or server performing operations comprising:

displaying at least one map or map image in a GUI based at least in part on data or information from the mapping component.

7. The system of claim 6, further comprising displaying at least one of a user selectable or adjustable menu, field, and toggle.

8. The system of claim 6, wherein the map or map image includes a display of at least one virtual gas detector.

9. The system of claim 8, wherein the displayed position of the at least one virtual gas detector represents a physical location in the at least one actual training area or location.

10. The system of claim 8, wherein the at least one virtual gas detector is positioned, re-positioned or moved based at least in part on the GPS position data.

11. The system of claim 6, further comprising displaying at least one representation of a gas leak, hazard, or gas infrastructure.

12. The system of claim 11, wherein the location of the at least one representation of a gas leak, hazard, or gas infrastructure is user-selectable.

13. A gas training system comprising:
at least one computing device or server coupled to a mapping component;
at least one virtual leak detector coupled to the at least one computing device or server, the at least one virtual leak detector configured to communicate at least one location or GPS position data;
at least one trainee device or good coupled with the at least one virtual leak detector, the at least one trainee device or good discoverable by the at least one computing device or server;
a non-transitory computer readable medium coupled to the at least one computing device or server, having stored thereon, instructions that when executed by the at least one computing device or server, cause the at least one computing device or server to perform operations comprising at least:
retrieving at least one map and/or image from the mapping component representing at least one actual training area or location; and
based at least in part on the at least one location or GPS position data received from the at least one virtual leak detector, displaying at least one map or map image including a representation of the at least one trainee device or good in a position on the at least one map or map image based at least in part on the actual physical location of the at least one trainee device or good;

displaying at least one map or map image in a GUI based at least in part on data or information from the mapping component; and displaying at least one of a representation of an emergency vehicle and a command trailer.

14. A gas training system comprising:
at least one computing device or server coupled to a mapping component;
at least one virtual leak detector coupled to the at least one computing device or server, the at least one virtual leak detector configured to communicate at least one location or GPS position data;
at least one trainee device or good coupled with the at least one virtual leak detector, the at least one trainee device or good discoverable by the at least one computing device or server;
a non-transitory computer readable medium coupled to the at least one computing device or server, having stored thereon, instructions that when executed by the at least one computing device or server, cause the at least one computing device or server to perform operations comprising at least:
retrieving at least one map and/or image from the mapping component representing at least one actual training area or location; and
based at least in part on the at least one location or GPS position data received from the at least one virtual leak detector, displaying at least one map or map image including a representation of the at least one trainee device or good in a position on the at least one map or map image based at least in part on the actual physical location of the at least one trainee device or good;
displaying at least one map or map image in a GUI based at least in part on data or information from the mapping component; and
displaying at least one image of a trainee carrying the at least one trainee device or good.

15. The system of claim 6, wherein the user selectable menu, field, and toggle includes at least one of a layers, scenarios, and device option.

16. A gas training system comprising:
at least one computing device or server coupled to a mapping component;
at least one virtual leak detector coupled to the at least one computing device or server, the at least one virtual leak detector configured to communicate at least one location or GPS position data;
at least one trainee device or good coupled with the at least one virtual leak detector, the at least one trainee device or good discoverable by the at least one computing device or server;
a non-transitory computer readable medium coupled to the at least one computing device or server, having stored thereon, instructions that when executed by the at least one computing device or server, cause the at least one computing device or server to perform operations comprising at least:
retrieving at least one map and/or image from the mapping component representing at least one actual training area or location; and
based at least in part on the at least one location or GPS position data received from the at least one virtual leak detector, displaying at least one map or map image including a representation of the at least one trainee device or good in a position on the at least one map or map image based at least in part on the actual physical location of the at least one trainee device or good;

displaying at least one map or map image in a GUI based at least in part on data or information from the mapping component; and wherein the user selectable menu, field, and toggle includes at least one of a layers, scenarios, and device option; and wherein the scenarios option is configured enable a user to define a training scenario, the training scenario including at least one of an option to define the number a specific number of gas leaks, the position of the gas leaks, the position of at least one emergency vehicle, and the position of at least one command trailer.

17. A gas training server system comprising:

a computing device comprising at least one processor;

a non-transitory computer readable medium, having stored thereon, instructions that when executed by the at least one processor, cause the computing device to perform operations comprising at least:

retrieve location or GPS position data from at least one virtual leak detector coupled or integrated with at least one actual or mock gas detector;

retrieve at least one map and/or image from a mapping component representing at least one actual training area or location;

based at least in part on the at least one location or GPS position data received from the at least one virtual leak detector, display at least one map or map image including a representation of the at least one actual or mock gas detector in a position on the at least one map or map image based at least in part on the actual physical location of the at least one actual or mock gas detector; and displaying a real-life view of a trainee carrying the at least one virtual leak detector or simulated life-like representation of the trainee at least one virtual leak detector.

18. The server system of claim 17, wherein the at least one virtual gas detector is positioned, re-positioned or moved based at least in part on the GPS position data transmitted from the at least one actual training area or location.

19. The server system of claim 17, further comprising displaying at least one representation of a gas leak, hazard, or gas infrastructure.

20. A gas training server system comprising:

a computing device comprising at least one processor;

a non-transitory computer readable medium, having stored thereon, instructions that when executed by the at least one processor, cause the computing device to perform operations comprising at least:

retrieve location or GPS position data from at least one virtual leak detector coupled or integrated with at least one actual or mock gas detector;

retrieve at least one map and/or image from a mapping component representing at least one actual training area or location; and based at least in part on the at least one location or GPS position data received from the at least one virtual leak detector, display at least one map or map image including a representation of the at least one actual or mock gas detector in a position on the at least one map or map image based at least in part on the actual physical location of the at least one actual or mock gas detector;

displaying a user selectable menu, field, and toggle including at least one of a layers, scenarios, and device option; and wherein the menu, field or toggle is configured enable a user to define a training scenario, the training scenario including at least one of an option to define the number a specific number of gas leaks, the position of the gas leaks, the position of at least one emergency vehicle, and the position of at least one command trailer.

* * * * *